US009065882B2

(12) United States Patent
Stone

(10) Patent No.: US 9,065,882 B2
(45) Date of Patent: Jun. 23, 2015

(54) PROCESSING SIGNALING CHANGES

(71) Applicant: Christopher Stone, Newton, PA (US)

(72) Inventor: Christopher Stone, Newton, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 225 days.

(21) Appl. No.: 13/786,028

(22) Filed: Mar. 5, 2013

(65) Prior Publication Data

US 2014/0258443 A1 Sep. 11, 2014

(51) Int. Cl.
*G06F 15/16* (2006.01)
*H04L 29/06* (2006.01)
(52) U.S. Cl.
CPC .......... *H04L 65/605* (2013.01); *H04L 65/1069* (2013.01); *H04L 65/4084* (2013.01)
(58) Field of Classification Search
CPC ............ H04L 65/1069; H04L 65/4084; H04L 65/605
USPC ................................. 709/200–203, 217–227
See application file for complete search history.

(56) References Cited

U.S. PATENT DOCUMENTS

| 7,032,003 | B1* | 4/2006 | Shi et al. ....................... 709/203 |
| 8,457,613 | B2* | 6/2013 | Schmackpfeffer et al. ... 455/415 |
| 8,856,854 | B2* | 10/2014 | Feng et al. .................... 725/131 |
| 2007/0083661 | A1* | 4/2007 | Lin ............................... 709/227 |
| 2011/0319061 | A1* | 12/2011 | Schmackpfeffer et al. ... 455/415 |
| 2014/0089556 | A1* | 3/2014 | Ballard ......................... 710/316 |
| 2014/0129742 | A1* | 5/2014 | Lai et al. ........................ 710/36 |

OTHER PUBLICATIONS

"CEA-708," en.wikipedia.org/wiki/CEA-708, printed Dec. 4, 2012, pp. 1-10.
"True 708 versus 608 captions," Closed Captioning & Subtitling Software & Services for HD Video and Television, printed Dec. 4, 2012, pp. 1-2.
"Extended Data Services," Wikipedia, printed Dec. 4, 2012, p. 1.
"Program-specific information," en.wikipedia.org/wiki/Program-specific_information#PAT_.28program_association_table29, printed Dec. 4, 2012, pp. 1-5.

* cited by examiner

*Primary Examiner* — Moustafa M Meky
(74) *Attorney, Agent, or Firm* — Banner & Witcoff, Ltd.

(57) ABSTRACT

The disclosure relates to tracking commands and data received from many sources. A device may receive a command from a user and forward the command to a network device. The device may also receive data from the network device and may determine whether the received data indicates that a previously forwarded command was received by the network device. If the received data does not indicate that the command was received, the device may perform one or more actions, such as resending the command.

20 Claims, 7 Drawing Sheets

"Scroll up" command

PROCESSING SIGNALING CHANGES

BACKGROUND

As distributed computing becomes more popular, data and/or command processing that were historically performed locally on a local device may be performed remotely on a network device. Distributed computing may be performed by a cloud-based system. In distributed systems, local devices may become simple transmission devices. A set-top box, an example of a local device, may receive commands from a user's remote control device and simply forward the commands to a network for processing. The local device may similarly receive data from the network, such as data for rendering a video program or a graphical user interface (e.g., an electronic program guide). Video may be rendered, however, without determining whether the video corresponds to any particular command. This may be problematic if delays in the network prevent the network from responding to commands in a timely manner. For example, a user that issues a command, such as a scroll up command, might expect the current display by the set-top box to change in a timely manner. If the display does not change, however, the user may issue the same command again, leaving the network with two scroll up commands when the user only intended one. The user may then have to issue a scroll down command to undo one of the scroll up commands.

SUMMARY

The aforementioned problems may be avoided by providing a user device (such as a gateway, terminal network device, set-top box, etc.), a backend network device, and/or a communication and signaling method that intelligently tracks commands. This summary is not intended to identify critical or essential features of the disclosures herein, but instead merely summarizes certain features and variations thereof. Other details and features will also be described in the sections that follow.

Some of the various features described herein relate to a system and method for signaling changes in a display provided to or by a user device, such as a terminal (e.g., smartphone, set-top box, computing device, display device, etc.). A method of delivering data may comprise receiving, at a computing device (e.g., a user device), a first command from a user. An indication of the first command may be stored at the user device, and the first command may be sent to a second computing device, such as a network device (e.g., a backend computing device). The computing device may comprise a set-top box and the second computing device may comprise a server in a cloud-based network. The user device may receive, from the backend device, a data stream, and the user device may determine whether the data stream includes a second indication identifying the first command previously sent to the backend device. If the data stream includes the second indication identifying the first command, the stored indication of the first command may be discarded because receipt of the second indication may indicate that the backend device successfully received and/or processed the first command. If the data stream does not include the second indication identifying the first command, the user device may resend the first command to the backend device using the stored indication of the first command.

The method may also include determining one or more of a first delay time period that identifies a length of time for transmissions to travel from the user device to a network device, such as a the backend device, and a second delay time that identifies a length of time for transmissions to travel from the backend device to the user device. Determining the first delay time or the second delay time may comprise sending, by the user device, a message to the backend device, receiving, at the user device and from the backend device, a response to the message, and determining a round-trip time based on the response to the message. Based on the determination of at least one of the first delay time and the second delay time, a wait period that indicates a length of time to wait for the second indication identifying the first command may be set. If the second indication identifying the first command is not received during the wait period, the backend device may have failed to receive the first command. In some aspects, a communication link between the user device and the backend device may include an IP network link, and determining the first delay time or the second delay time may comprise sending, by the user device to the backend device, a ping message.

Some aspects may include receiving, at the user device during a wait period, a plurality of data streams including the data stream received from the backend device (or another network device). The wait period may indicate a length of time to wait for the second indication identifying the first command. The user device may receive a second command from the user during the wait period, and the user device may determine that the second command is the same as the first command. In response to determining that the first and second commands are the same, the second command may be stored. The method may further comprise determining that the second indication identifying the first command has been received within the wait period, and in response to the determination, discarding the stored second command. Alternatively, the method may comprise determining that the second indication identifying the first command has not been received within the wait period, and in response to the determination, sending the second command to the backend device.

In some aspects, the method may include receiving, at the user device during a wait period, a plurality of data streams including the data stream received from the backend device. As previously noted, the wait period may indicate a length of time to wait for the second indication identifying the first command, and in response to determining that the wait period has ended, the user device may resend the first stored command to the backend device.

In some aspects, the data stream may comprise a video stream. Furthermore, the second indication identifying the first command may be stored in one or more of a program map table, a program association table, and extended data services received with the video stream. The received video stream may be displayed on a display device, which may be integrated with or connected to the user device.

A method of delivering data streams may comprise receiving, at a computing device, a first command to change an image currently displayed on a user device (e.g., a television or other display device). The computing device may send the first command to a second computing device. The second computing device may comprise a plurality of computing devices in a cloud-based network, and the computing device may comprise a set-top box. A wait period for the first command may be determined. The wait period may indicate a length of time to wait for an indication identifying that the second computing device received the first command. A second command may be received at the computing device. If the second command is received during the wait period for the first command and the second command matches the first command, the second command may be stored without sending the second command to the second computing device. The method may further comprise sending the second command to the second computing device if the second command is not received during the wait period for the first command.

The method may further comprise determining that the computing device has not received, during the wait period, the indication identifying that the second computing device received the first command. In response to determining that the computing device has not received the indication, the second stored command may be sent to the second computing device. Alternatively, if the second command matches the first command, the method may further comprise determining that the computing device has received, during the wait period, the indication identifying that the second computing device received the first command. In response to determining that the computing device has received the indication, the second stored command may be discarded.

In some aspects, non-transitory computer-readable media storing computer-readable instructions that, when executed by a computing device, may cause a computing device to receive a first command from a remote control device and forward the first command to a second computing device. The computing device may determine a wait period for the first command, the wait period indicating a length of time to wait for an indication identifying that the second computing device received the first command. The computing device may receive a second command from the remote control device during the wait period for the first command. In response to determining that the second command matches the first command, the second command may be stored. The computing device may send the second command to the second computing device after the wait period for the first command ends if a data stream received during the wait period and from the second computing device does not indicate that the second computing device received the first command. In some aspects, the data stream may comprise a video stream, and the computing device may determine whether the indication identifying that the second computing device received the first command is included as metadata received with the video stream.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
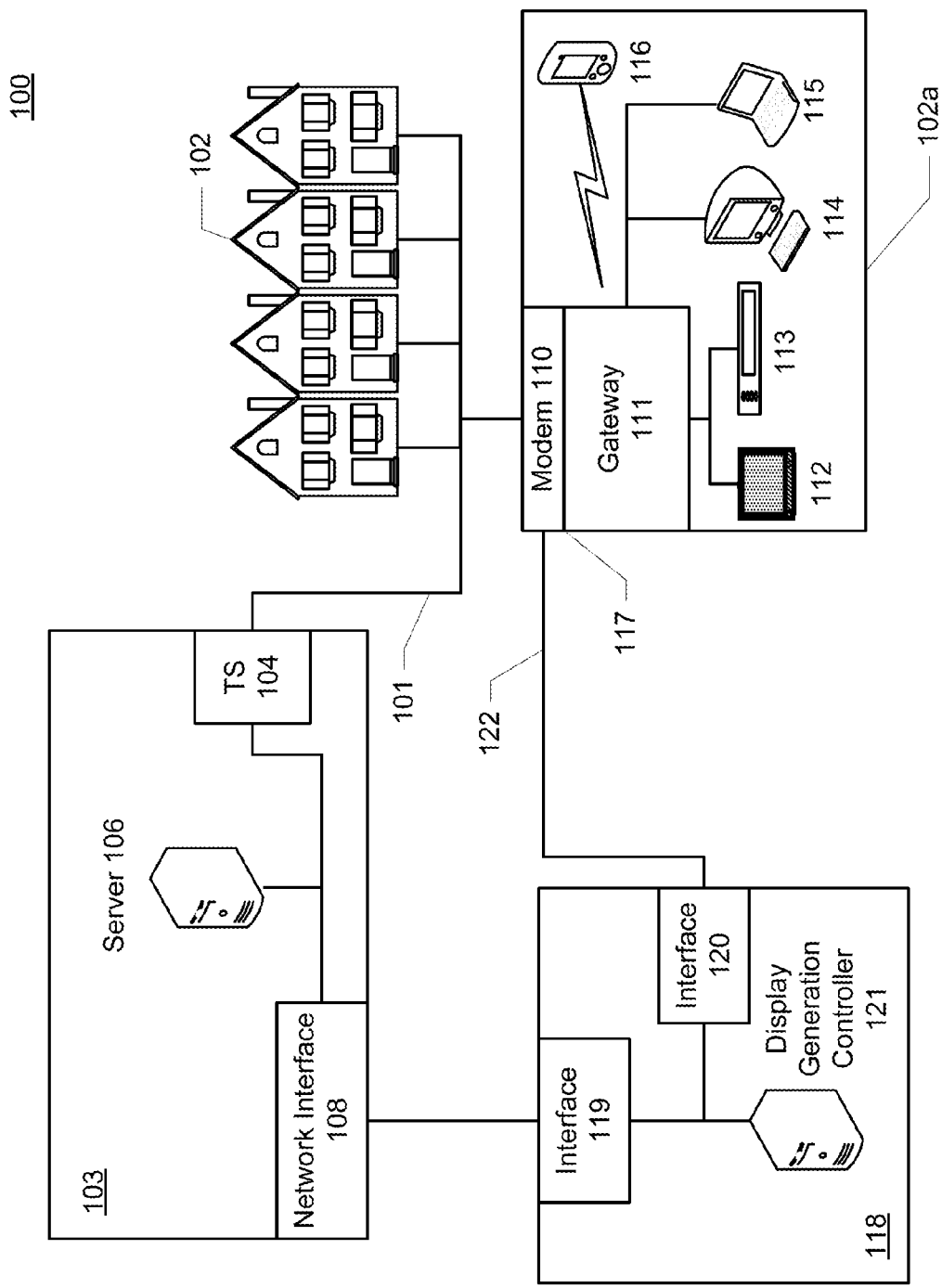
FIG. 1 illustrates an example information processing and distribution network.

FIG. 1 illustrates an example information processing and distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Network 100 may be implemented as a cloud-based network having distributed data processing, distributed data storage, platform storage, or the like. Such networks 100 use a series of interconnected communication links 101 and 122 (e.g., coaxial cables, optical fibers, wireless connections, etc.) to connect multiple premises, such as homes 102, to a local office (e.g., a central office or headend 103) and/or one or more additional computing devices 118. In some aspects, links 101 and 122 may comprise the same links or different links. A local office 103 may transmit downstream information signals onto the links 101, and each home 102 may have devices used to receive and process those signals.

There may be one link 101 originating from the local office 103, and it may be split a number of times to distribute the signal to various homes 102 in the vicinity (which may be many miles) of the local office 103. Although the term home is used by way of example, homes 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as server 106 and computing device 118 (to be discussed further below). The backend device may comprise any network device. The interface may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks such as networks of Internet devices, telephone networks, cellular telephone networks, fiber optic networks, local wireless networks (e.g., WiMAX), satellite networks, and any other desired network. The interface 108 may include the corresponding circuitry needed to communicate on these networks and with other devices on the network, such as computing device 118 and/or a cellular telephone network and its corresponding cell phones.

As noted above, the local office 103 may include a variety of servers that may be configured to perform various functions. For example, the local office 103 may include a data server 106. The data server 106 may comprise one or more computing devices that are configured to provide data (e.g., content) to users in the homes. This data may be, for example, video on demand movies, television programs, other audio-visual content, songs, text listings, or any other type of data. The data server 106 may include software to validate user identities and entitlements, locate and retrieve requested data, encrypt the data, and initiate delivery (e.g., streaming) of the data to the requesting user and/or device.

An example home 102a may include an interface 117. The interface 117 may comprise a device 110, such as a modem, which may include transmitters and receivers used to communicate with the local office 103 on the links 101 and/or with other computing devices (e.g., computing device 118) on links 122. The device 110 may comprise, for example, a coaxial cable modem (for coaxial cable links 101), a fiber interface node (for fiber optic links 101), a wireless interface node, or any other desired modem device. The device 110 may be connected to, or be a part of, a gateway interface device 111. The gateway interface device 111 may be a computing device that communicates with the device 110 to allow one or more other devices in the home to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), remote controls, etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Instead of communicating with backend devices using the gateway 111, the devices may directly communicate with the backend devices.

The local office 103 and/or devices in the home 102a (e.g., a gateway 111, a wireless device 116, etc.) may communicate with a computing device 118 via one or more interfaces 119 and 120 of the computing device. The interfaces 119 and 120 may include transmitters and receivers used to communicate via wire or wirelessly with local office 103 and/or user devices using any of the networks previously described (e.g., cellular network, optical fiber network, copper wire network, etc.). Computing device 118 may have a variety of servers and/or processors, such as a display generation controller 121, which may be configured to perform various functions. As will be described in further detail in the examples below, the computing device 118 may be configured to receive commands from user devices (e.g., devices in the home 102a or any other user devices, which need not be located within the home 102a) and generate or update displays based on those commands.

The computing device 118, as illustrated, may be one or more components within a cloud computing environment. Additionally or alternatively, computing device 118 may be located at local office 103. For example, computing device 118 may comprise one or more servers in addition to data server 106 and/or be integrated within data server 106.

Figure 2:
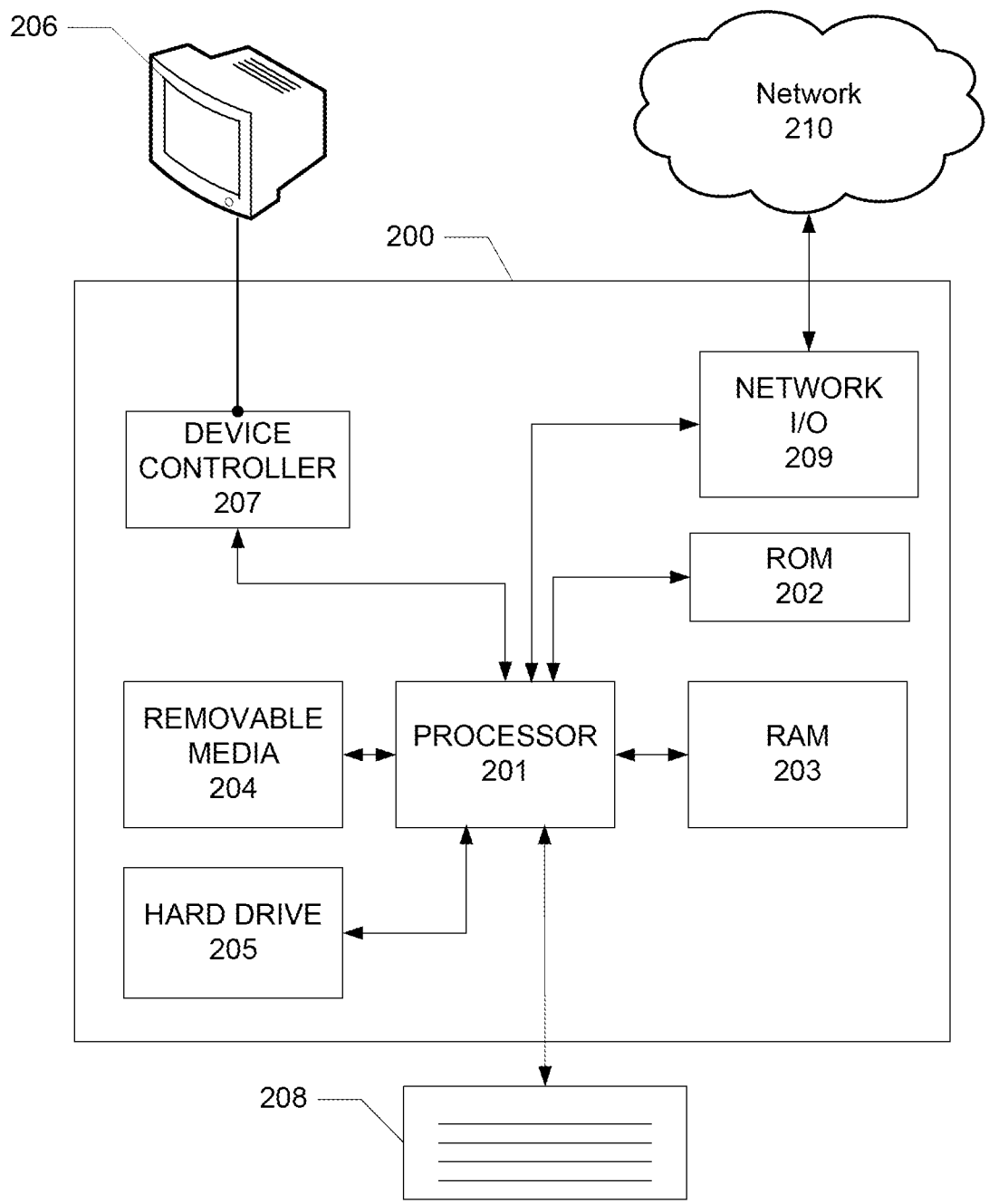
FIG. 2 illustrates an example computing device on which various elements described herein can be implemented.

FIG. 2 illustrates general hardware elements that can be used to implement any of the various computing devices discussed herein. The computing device 200 may include one or more processors 201, which may execute instructions of a computer program to perform any of the functions or steps described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces 209, such as input/output circuits (such as a network card) to communicate with an external network 210. The network interface 209 may be a wired interface, wireless interface, or a combination of the two. In some embodiments, the network interface 209 may include a modem (e.g., a cable modem), and network 210 may include the communication links 101 and 122 discussed above, the external network 109, an in-home network, a provider's wireless, coaxial, fiber, or hybrid fiber/coaxial distribution system (e.g., a DOCSIS network), or any other desired network.

Figure 3:
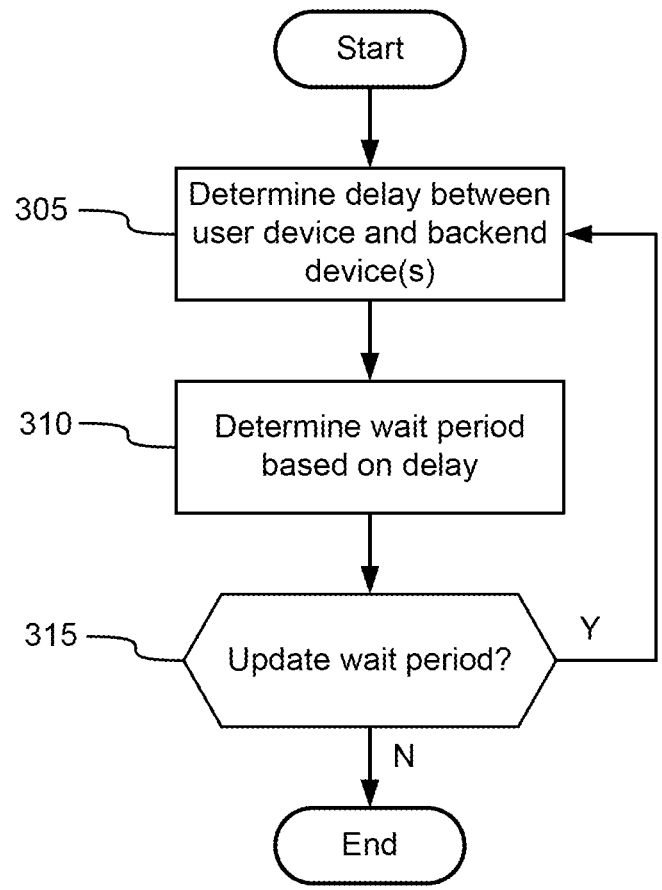
FIG. 3 illustrates an example method for implementing one or more aspects described herein.

FIG. 3 illustrates an example method of determining a wait period for receiving data from backend devices. One or more user device (e.g., gateway 111, personal computer 114, mobile device 116, etc.) or backend computing device (e.g., a computing device located at local office 103, computing device 118, or elsewhere on the network 100) may perform the steps illustrated in FIG. 3. For the sake of brevity, the steps illustrated in FIG. 3 will be described as being performed by a user device, such as a STB.

In step 305, a user device may determine a time delay (e.g., latency) between the user device and one or more backend computing devices. In some aspects, the amount of time for the user device to forward data, such as a user command or other message, to the backend devices and for the backend devices to acknowledge receipt of the data may depend on delays cause by numerous transmission, storage, and/or processing activities. For example, delays may be caused by the transmission of data from the user device to the backend computing devices (e.g., a computing device 118) (or vice versa). Transmission delays may be caused by an unusually overloaded network 100 or if bandwidth on the network is otherwise restricted. Delays may also occur if the data is not routed in an optimal manner, such as by making more network hops than expected. Storage and/or processing activities (e.g., performed by the backend computing devices) may similarly cause delays if they are performing other tasks or unusually overloaded. For example, delays may occur when converting the data between different protocols, such as when the data traverses from a Gigabit Ethernet network to a 100 Base-T network.

In some aspects, the delay time may comprise the amount of time it takes for data to travel from a user device to a backend device, the amount of time it takes for data to travel from a backend device to a user device, or a combination thereof (e.g., a round-trip time). For example, the user device may determine the delay by sending a message to a backend device. Similarly, the user device may determine the delay if the backend device sends a reply to the message. A round-trip time may be calculated based on the message transmitted by the user device and the reply message. For example, using Internet Protocol, the user device may transmit a ping message to one or more backend devices. The user device may use the ping message to determine the time delay. Any other methods of calculating network delay readily apparent to one of ordinary skill in the art may be used. For example, the system may generate a test pattern and measure how long it takes a user device, such as an STB, to receive, decode, and/or render a test pattern image received from backend devices. In some embodiments, the system may present a set-up wizard to the user. The user may step through displays rendered by the STB, such as by clicking "OK" commands on the user's remote control based on prompts displayed on the displayed UIs, to determine the delay time.

In step 310, the user device may determine a wait period based on the delay determined in step 305. The user device may use the wait period to determine the amount of time to wait before determining that the backend device failed to receive a command. For example, the user device may forward a command, such as a command to scroll up on a display, such as an electronic program guide. When the command is sent, the user device may set the wait period to two seconds. If the two second wait period passes, and the user device has not received an acknowledgment of receipt from the backend computing device, the user device may perform one or more actions, including resending the command. The user device may perform any additional actions as will be described in further detail below with respect to FIGS. 4 and 6. The wait period may be greater than or equal to the amount of time that the user device expects to receive an acknowledgement message from the backend device. For example, if the user device estimates that it will take two seconds to receive the acknowledgment, the user device may set the wait period to two seconds. The user device may also add a time buffer, such as 200 milliseconds to account for possible variances. Accordingly, the wait period may be 2.2 seconds. As will be described in further detail in the examples below, the user device may receive the acknowledgment in a transport stream used to transmit data (such as data for rendering a display) generated in response to the command.

In step 315, the user device may determine whether to update the wait period. The wait period may be manually updated by a service provider and/or a user. For example, while using the system, a user may observe that the user device is resending commands too often and conclude that the wait period is too short. The user may increase the wait period to prevent the user device from inadvertently resending commands. The user may, for example, adjust the wait period from the menu of an electronic program guide. The user device may periodically update the wait period (e.g., update every twenty minutes, every day, etc.). The wait period may also be adjusted if a change in the latency of the network 100 is detected. The user device and/or a backend device may detect this change in latency. For example, the initial time delay may have been calculated (in step 305) while the network was in an impaired state (e.g., experiencing unusually high amounts of traffic, downed routers, less than optimal routing, etc.). When the network returns to normal, the user device may recalculate the time delay and corresponding wait period by returning to step 305.

Figure 4:
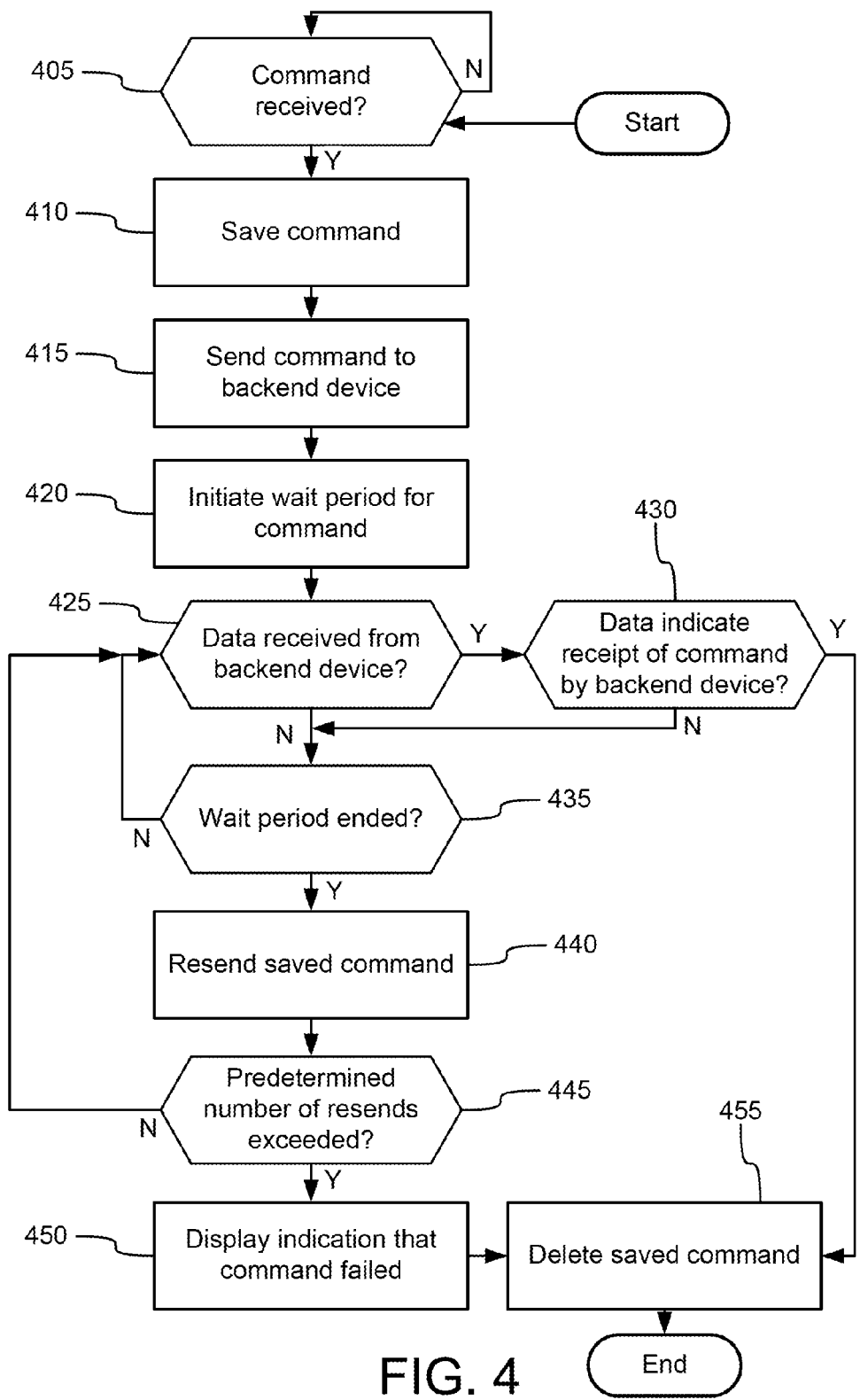
FIG. 4 illustrates an example method for implementing one or more aspects described herein.

FIG. 4 illustrates an example method of processing and sending a command. One or more user devices or backend computing devices may perform the steps illustrated in FIG. 4. For the sake of brevity, the steps illustrated in FIG. 4 will be described as being performed by a user device, such as a STB or a mobile device.

Figure 7:
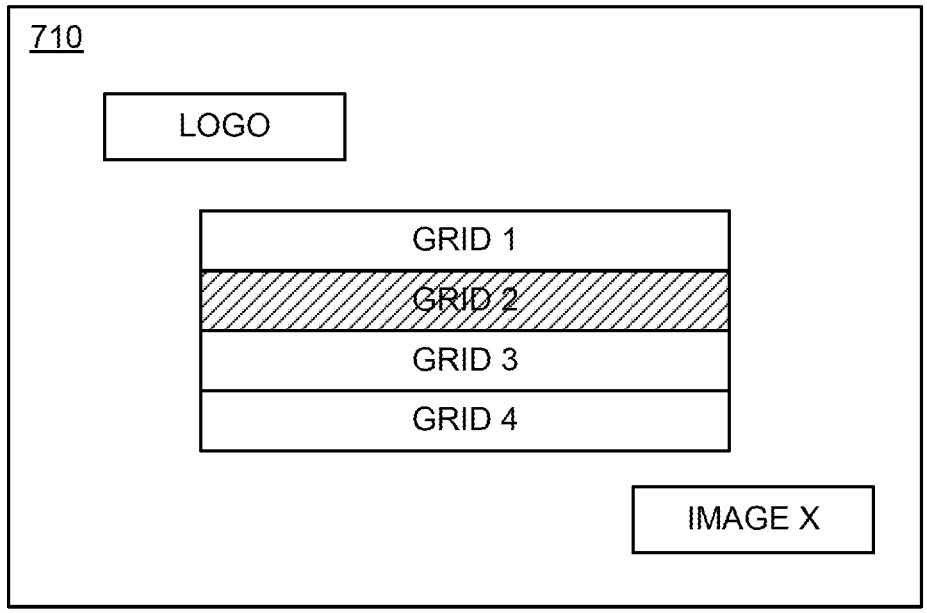
FIG. 7 illustrates an example of a display.
Figure 7:
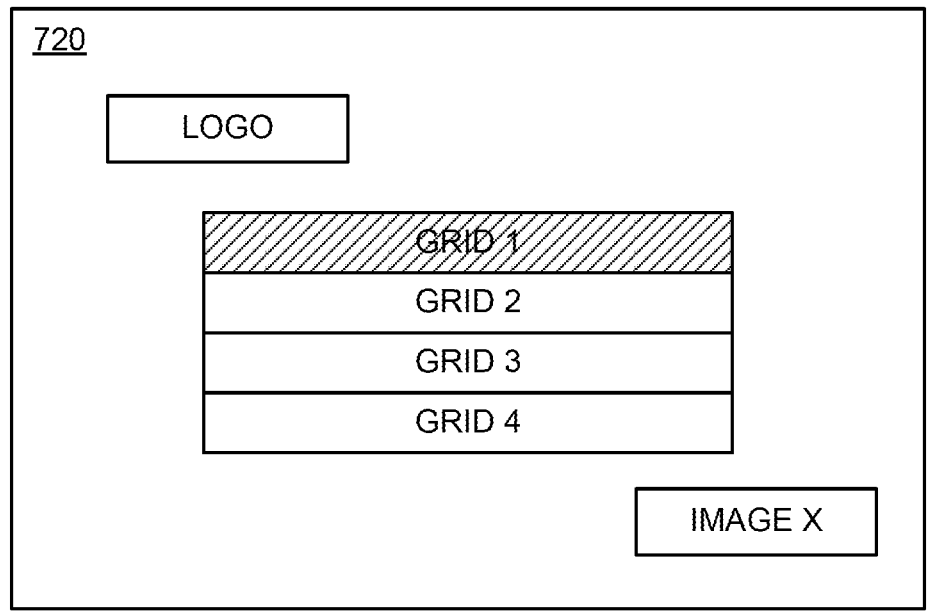

In step 405, the user device may wait to receive a command, such as a command from a user. For example, the user may be browsing an electronic program guide (EPG) using the television 112 and STB 113. FIG. 7 illustrates an example EPG 710, which may include a plurality of different graphical elements including logos, images, grids, text, and the like. In EPG 710, Grid 2 is highlighted. Grid 2 may correspond to a channel and/or television program and the name of the channel and/or television program may be displayed in Grid 2. The user may issue a "scroll up" command, such as by pressing "up" on a remote control device. Based on the command, the user may expect Grid 1, which corresponds to a different channel and/or television program, to be highlighted. Example EPG 720 illustrates Grid 1 being highlighted in response to a scroll up command. As will be described in further detail in the examples below, the STB may forward the scroll up command to one or more backend devices, which may be responsible for generating the EPG 720. However, the backend device might not receive the command, the command might be delayed, or other delays may cause the backend device to react to the command in a delayed manner. The concepts described herein are not limited to changing the display of an EPG and can equally apply to generating and/or updating any type of display. Other examples of displays include, but are not limited to, a display of a video program, a display of information overlaid over a video program (e.g., an EPG overlaid over a television program), a web browser display, a photo, etc.

Similarly, the concepts described herein are not limited to scroll up commands and can equally apply to any type of command. Other types of commands include, but are not limited to, scrolling down, switching channels, navigating to a menu, selecting one or more options, recording a program, playing a program, inserting text (e.g., inserting text into a search query), and the like. In some aspects, the command may be initiated by a user. The user may use any interface device connected to or integrated within user devices to issue the commands. Examples of a user initiating a command include, but are not limited to, selecting a hyperlink, pressing a virtual button on a mobile phone having a touch screen display, pressing physical buttons on a remote control communicating with a television or STB, pressing buttons on the television or STB, using a keyboard to type text, etc.

In step 410, the user device may save the received command (e.g., store an indication of the command in memory). The command may be stored locally at a storage device of the user device or at another storage location, such as storage in the home 102a, on network 100, etc. The user device may store an identifier for the command. For example, if the command is a scroll up command, the command may be assigned an identifier that uniquely identifies the command, such as UPCMD30781, or an identifier that identifies the type of command, such as UPCMD.

In step 415, the user device may send the command to one or more backend computing devices. As previously discussed, the backend devices may be arranged in a cloud computing architecture. The backend devices may be responsible for processing and/or otherwise responding to the command. In other words, the user device may be responsible for forwarding the command, but might not be responsible for generating a display based on the command. Accordingly, the user device might function as a "dumb" device. For example, the user device may forward a scroll up command to a backend device, and the backend device may update the display from display 710 to display 720 (illustrated in FIG. 7) in response to the command. Generating displays by the backend devices will be described in further detail below with reference to FIG. 5.

In step 420, the user device may initiate a wait period for the received command. For example, the user device may start a timer for the wait period. The wait period may have been previously calculated, as was previously discussed with reference to FIG. 3. The wait period may depend on network latency. The wait period may also depend on the type of command received. The backend devices may process certain commands and/or transmit data in response to the commands more quickly than other types of commands. For example, the scroll up command illustrated in FIG. 7 might require less time to process than a command to tune to a particular channel because updating the EPG from EPG 710 to EPG 720 may require less time than connecting the user device to the selected channel. In this example, the wait period for the scroll up command may be 400 milliseconds whereas the wait period for selection of a program command may be one second. In another example, a scroll up command while grid 2 in the middle of the EPG 710 is highlighted might require less time to process than a scroll up command while grid 1 at the top of the EPG is highlighted because a smaller portion of the UI would need to be updated in the former situation. In the latter situation, an entirely new set of images and/or content, such as replacement content for grids 1-4, may need to be processed and delivered to the user device. Likewise, a scroll down command may take less time than a page down command. Accordingly, each type of command may be associated with a particular wait period based on network latency and the amount of time calculated and/or estimated to complete a command.

In step 425, the user device may determine whether data has been received from one or more backend devices. Received data may include, but is not limited to, content (video content, audio content, etc.), system updates (e.g., software updates), queries (e.g., user device status query, user device MAC address query, etc.), and any other types of data. The user device may decode the received data and/or determine whether the data from the backend device responds to a command forwarded to the backend device.

In particular, in step 430, the user device may determine whether the received data indicates that the backend device received the forwarded command. In one embodiment, the message may be primarily dedicated to indicating that the backend device received the command. This message may also indicate that one or more backend devices is currently processing the command and that additional data associated with the command (e.g., an updated EPG display 720) will be sent in the future. The backend devices may separately send the acknowledgment and the data if responding to the command requires significant computing resources, if sufficient computing resources are currently unavailable, and/or if the network is otherwise bottlenecked. By sending a dedicated acknowledgment message that requires fewer network resources to the user device prior to sending the data (e.g., EPG display), the backend devices may make the user device aware of the receipt of the command and prevent the user device from having to resend the command (as will be further discussed below). Sending a dedicated acknowledgment message is optional.

Figure 5:
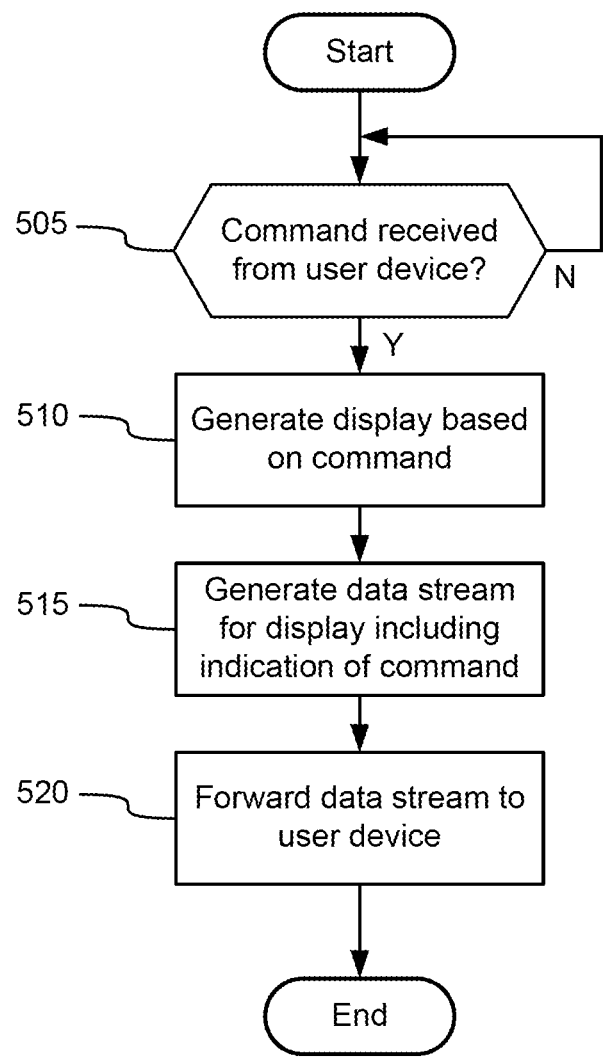
FIG. 5 illustrates an example method for implementing one or more aspects described herein.

In some embodiments, the acknowledgment message and the data responding to the command may be delivered together. For example, FIG. 5 illustrates an example method of generating a display based on a command. One or more backend computing devices may perform the steps illustrated in FIG. 5.

In step 505, the backend device may wait to receive a command from a user device. When a command is received, the backend device may determine how to respond to the command. For example, in step 510, the backend device may generate a display, such as an EPG 720 (having Grid 1 highlighted) illustrated in FIG. 7. The backend device may have previously generated the EPG 710 (having Grid 2 highlighted). Upon receipt of a scroll up command, the backend device may change the display sent to the user from EPG 710 to EPG 720. In some aspects, the display generated in step 510 (e.g., an electronic program guide) may comprise a still frame image.

While FIG. 7 illustrates a change in the display of an EPG, the display change may apply to any other types of data displayed to the user. For example, when the user navigates settings menus (e.g., to configure grid colors, configure closed captioning settings, or to configure other settings), the backend devices may generate displays based on the user's navigation through these menus.

In step 515, the backend device may forward the generated display to an encoding device, which may be another backend device. The encoding device may generate a data stream from the display generated in step 510. For example, the encoding device may duplicate and/or otherwise encode the still frame image to generate a video stream of a display, such as an electronic program guide. The encoding device may also receive, from the backend device, an indication of the command. The encoding device may include the indication of the command with the encoded data stream delivered to the user device, so that the user device may determine that the data stream corresponds to a particular command that the user device previously sent.

The indication of the command may be embedded in a data field of the data stream in several different formats. For example, the command may be included in a program map table (PMT) delivered with the display data in a transport stream. Typically, the PMT may be used to provide descriptions or other information about audio, video, and/or other data streams associated with programs. For example, if a particular program contains audio and video streams, a PMT may indicate to a device receiving the PMT, such as an STB, the PID values for the audio and video streams for the program. The PMT may also contain information about the type of audio encoded in the audio stream and/or the type of video encoded in the video stream. According to the present disclosure, an indication of a received command may also be included in the PMT (along with the other types of data typically included in a PMT). The PMT may be multiplexed into a transport stream at periodic intervals, such as eight times per second.

Alternatively (or additionally), the command may be included in a program association table (PAT) delivered with the display data. Typically, the PAT may be used to provide information about programs carried in one or more transport stream. Each transport stream may comprise one or more programs, such as HBO HD, HBO, or any other program. When one of the programs, such as HBO, is selected on the EPG grid, the EPG may perform a lookup in various tables to determine which channel (e.g., RF channel) to tune to and to determine the program number for the selected program. When the user device tunes to the channel and acquires the transport stream, the PAT may indicate which programs are on the transport stream. If the selected program is in the transport stream, the PAT may point to a corresponding PMT stream. The user device may acquire the PMT stream and discover the PIDs for the audio, video, and/or data streams for the selected program. According to the present disclosure, an indication of a received command may also be included in the PAT (along with the other types of data typically included in a PAT).

Other forms of delivering metadata may be used to deliver the indication of the command. For example, the encoding device may send an indication of the command as extended data services data, such as CEA-608 and/or CEA-708 data. Typically, the extended data services data may define how to deliver data, such as closed captioning data, parental control data, ratings data, copy control data, etc., to the user device or other receiver. According to the present disclosure, an indication of a received command may also be included as extended data services data. While the foregoing describes the device generating the display (step 510) and the device generating the data stream (step 515) as different devices, the same device may perform both steps.

In step 520, the encoding device may forward, to the user device, the data stream having the indication of the corresponding command. The data stream may be delivered to a user using a transport stream, such as an MPEG transport stream, an IP stream, or any other type of transport stream. A content delivery system may be used to transmit the data from the encoding device to the user device. The content delivery system may include one or more components, including (but not limited to) quadrature amplitude modulation (QAM) devices (e.g., an edge QAM tuner), Advanced Television Systems Committee (ATSC) devices, Internet Protocol (IP) devices (e.g., routers), and/or any other components capable of delivering content to the user device.

Returning to FIG. 4, in step 430, the user device may determine whether the data received from the backend device includes an indication of the command that the user device sent in step 415. For example, the user device may check the metadata received with the data stream for an indication of the command. As previously discussed, the metadata may be included in a PMT, PAT, extended data services, or any other metadata field. If the received data includes an indication that the backend device received the command, the user device may determine that the data responds to the command that the user device sent to the backend device. In step 455, the user device may also discard the command stored in memory (in step 410).

Data might not have been received from the backend device (step 425: N) and/or data received from the backend device might not indicate that the backend device received the command (step 430: N). In step 435, the user device may determine whether the wait period assigned to the command has ended. For example, if the wait period is 200 milliseconds for a scroll up command, the wait period may end when the 200 milliseconds from when the user device sent the command expires. If the wait period has not ended, the user device may return to step 425 and wait to receive data from one or more backend devices.

If the wait period has ended (step 435: Y) and no indication that one or more backend devices received the command, the user device may determine that the backend devices failed to receive the command. In some aspects, the network 100 and/or a routing device in the network may have dropped the command along the way from the user device to the backend device. In step 440, the user device may retrieve the command previously saved in step 410 and resend the command to the backend device. In some aspects, the user device may perform step 440 without requiring user action. For example, the user would not have to press scroll up a second time if the backend device did not receive a first scroll up command. As will be described in further detail with respect to FIG. 6, the user device may forward a second scroll up command instead of resending the first stored scroll up command if the user issued the second scroll up command during the wait period assigned to the first scroll up command.

In step 445, the user device may determine whether the stored command has been resent more than a predetermined number of times. The user device may track the number of times the stored command is resent. If the number of resends does not exceed the predetermined number, the user device may reset the wait period and return to step 425. If the number of resends exceeds the predetermined number (such as three times), the user device may decide not to attempt any additional resends.

In step 450, the user device may display (on the user device or a display device connected to the user device) an indication that the command failed. For example, if a scroll up command fails, the message may state: "Sorry. Your scroll up command could not be processed." In step 455, the user device may delete the command saved in step 410 (e.g., discard an indication of the command stored in memory) to prevent any additional resend attempts.

Figure 6:
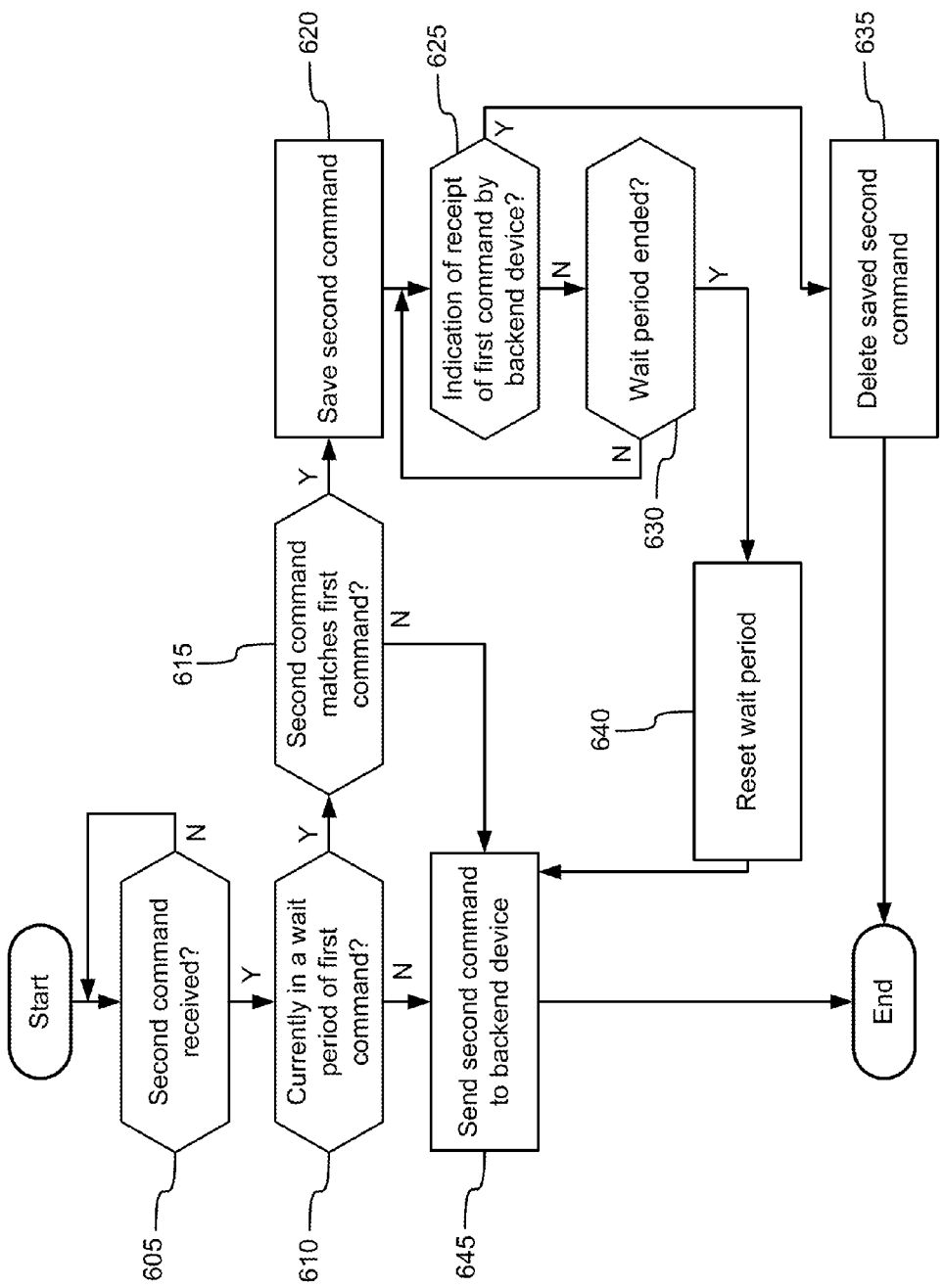
FIG. 6 illustrates an example method for implementing one or more aspects described herein.

FIG. 6 illustrates an example method of processing and sending a second command. One or more user devices or backend computing devices may perform the steps illustrated in FIG. 6. For the sake of brevity, the steps illustrated in FIG. 6 will be described as being performed by a user device.

In step 605, the user device may wait for a second command (e.g., a command in addition to the command received in step 405). When a second command has been received, in step 610 the user device may determine whether the user device is currently in a wait period for a first command. If the user device is not in the wait period for the first command, in step 645, the user device may send the second command to the backend device. After sending the second command, the user device may perform the steps illustrated in FIG. 4 starting at 410 (e.g., store the second command) to ensure that the second command is acted on.

If the user device is in the wait period for the first command, in step 615 the user device may determine whether the second command matches the first command. For example, the second command may match the first command if they are both scroll up commands. On the other hand, no match would occur if the first command is a scroll up command and the second command is a selection of a channel to watch. If the second command does not match the first command, the user device may forward the second command to the backend device in step 645.

If the second command matches the first command, in step 620, the user device may save the second command. In step 625, during the wait period, the user device may determine whether an indication that a backend device received the first command has been received. Step 625 may be similar to steps 425 and/or 430 previously discussed with respect to FIG. 4. If no indication has been received, the user device may determine, in step 630, whether the wait period for the first command has ended. If the wait period has not ended, the user device may return to step 625 and wait to receive data from one or more backend devices.

If the user device receives an indication of the first command during the wait period (step 625), the user device, in step 635, may delete the saved second command (e.g., discard an indication of the second command from memory). In particular, the user device may determine that the user initiated the second command because the user did not see a change in the display in response to the first command. For example, the user may believe that the user device did not receive the first command or that the command did not otherwise register. In one example, the user may issue two scroll up commands even if the user desires the EPG to scroll up only once. However, the user might not be aware of any network and/or device latencies that might contribute to a delay in processing the first command. This problem may be particularly prevalent in cloud-based networks.

In addition to discarding the second stored command, the user device may display a message to the user indicating that the user device determined that the second command was unintended and therefore discarded the second command. The user device may also provide the user with an option to override the discard action for the second command and/or an option to adjust the wait period. For example, the user device may adjust the wait periods for each command or type of command. The user may subtract 100 milliseconds from each wait period. Subtracting 100 milliseconds from each wait period may be beneficial if the user is particularly quick at issuing commands. The user may also subtract 100 milliseconds for scroll up commands and add 200 milliseconds for commands to tune to a particular channel. The user may also disable the wait period altogether so that each command received by the user device is sent to the backend devices.

Returning to step 630, if the wait period for the first command has ended (step 630: Y) and no indication of receipt of the first command has been received (step 625: N), the user device may reset the wait period in step 640. Then in step 645, the user device may forward the second command previously saved in step 620. The user device may then proceed to perform some of the steps illustrated in FIG. 4, starting from step 425 (waiting to receive data from backend devices). As previously discussed with respect to FIG. 4, if the user device does not receive an indication of receipt of the second command, the user device may continue to resend the second command a predetermined number of times (e.g., steps 440 and 445). While FIGS. 4 and 6 illustrate the example of the user device receiving two commands from a user, the user device may receive any number of commands and store, forward, and/or discard each received command according to the steps illustrated in FIGS. 4 and 6.

The various features described above are merely non-limiting examples, and can be rearranged, combined, subdivided, omitted, and/or altered in any desired manner. For example, features of the user device (which may be any of the devices 110-116) or backend device (which may be server 106 and/or computing device 118) described herein can be subdivided among multiple processors and computing devices. The true scope of this patent should only be defined by the claims that follow.

I claim:

1. A method comprising:
   receiving, at a first computing device, a command from a user device, the command comprising an identifier for the command;
   saving the identifier for the command;
   sending, by the first computing device, the command to a second computing device;
   receiving, at the first computing device, a data stream from the second computing device;
   determining whether a second identifier for the data stream corresponds to the identifier for the command; and
   if the second identifier corresponds to the identifier for the command, deleting the saved identifier for the command.

2. The method of claim 1, wherein the second computing device comprises a plurality of computing devices in a cloud-based network.

3. The method of claim 1, further comprising:
   if the second identifier does not correspond to the identifier for the command, resending, by the first computing device, the command to the second computing device using the saved identifier for the command.

4. The method of claim 1, further comprising:
   determining at least one of:
      a first delay time that identifies a length of time for transmissions to travel from the first computing device to the second computing device, and
      a second delay time that identifies a length of time for transmissions to travel from the second computing device to the first computing device;
   based on the determination of at least one of the first delay time and the second delay time, setting, by the first computing device, a wait period that indicates a length of time to wait for the second identifier corresponding to the identifier for the command; and
   if the second identifier corresponding to the identifier for the command is not received during the wait period, determining that the second computing device failed to receive the command.

5. The method of claim 4, wherein determining the first delay time or the second delay time comprises:
   sending, by the first computing device, a message to the second computing device;
   receiving, at the first computing device and from the second computing device, a response to the message; and
   determining a round-trip time based on the response to the message.

6. The method of claim 4, wherein a communication link between the first computing device and the second computing device includes an IP network link, and wherein determining the first delay time or the second delay time comprises:
   sending, by the first computing device to the second computing device, a ping message.

7. The method of claim 1, further comprising:
   receiving, at the first computing device during a wait period, a plurality of data streams including the data stream from the second computing device, wherein the wait period indicates a length of time to wait for the second identifier corresponding to the identifier for the command;
   receiving, at the first computing device, a second command from the user device during the wait period; and
   in response to determining that the second command is the same as the command,
   saving the second command.

8. The method of claim 7, further comprising:
   in response to determining that the second identifier corresponding to the identifier for the command has been received within the wait period, deleting the saved second command.

9. The method of claim 7, further comprising:
   in response to determining that the second identifier corresponding to the identifier for the command has not been received within the wait period, sending the second command to the second computing device.

10. The method of claim 1, further comprising:
    receiving, at the first computing device during a wait period, a plurality of data streams including the data stream from the second computing device, wherein the wait period indicates a length of time to wait for the second identifier corresponding to the identifier for the command; and
    in response to determining that the wait period has ended, resending, by the first computing device, the command to the second computing device.

11. The method of claim 1, wherein the first computing device comprises a set-top box and the second computing device comprises a server in a cloud-based network.

12. The method of claim 1, wherein the data stream comprises a video stream, the method further comprising:
    receiving, with the video stream, the second identifier in one of a program map table, a program association table, and extended data services.

13. The method of claim 1, wherein the data stream comprises a video stream, the method further comprising:
    displaying the video stream on a display device.

14. A method comprising:
    receiving, at a first computing device, a first command to change an image currently displayed on a display device;
    sending, by the first computing device, the first command to a second computing device;

determining a wait period for the first command, wherein the wait period corresponds to a length of time to wait for an indication that the second computing device received the first command;

receiving, at the first computing device, a second command; and if the second command is received during the wait period for the first command and the second command corresponds to the first command, saving the second command without sending the second command to the second computing device.

15. The method of claim 14, further comprising:

if the second command is not received during the wait period for the first command, sending the second command to the second computing device.

16. The method of claim 14, wherein the second computing device comprises a plurality of computing devices in a cloud-based network, and wherein the first computing device comprises a set-top box.

17. The method of claim 14, further comprising:

in response to determining that the first computing device has not received, during the wait period, the indication that the second computing device received the first command, sending the second saved command to the second computing device.

18. The method of claim 14, further comprising:

in response to determining that the first computing device has received, during the wait period, the indication that the second computing device received the first command, deleting the second saved command.

19. A method comprising:

receiving, at a first computing device, a first command from a user device;

sending, by the first computing device, the first command to a second computing device;

determining a wait period for the first command, wherein the wait period corresponds to a length of time to wait for an indication that the second computing device received the first command;

receiving, at the first computing device, a second command from the user device; and if the second command is received during the wait period for the first command and the second command corresponds to the first command, saving the second command without sending the second command to the second computing device.

20. The method of claim 19, further comprising:

in response to determining that the wait period has ended, sending, by the first computing device, the second command to the second computing device.

* * * * *